(12) United States Patent
Irving et al.

(10) Patent No.: US 8,290,757 B2
(45) Date of Patent: Oct. 16, 2012

(54) METHOD, SYSTEM AND COMPUTER READABLE MEDIA FOR DEFORMING SIMULATION MESHES USED IN POSING ANIMATED CHARACTERS

(75) Inventors: Geoffrey Irving, Berkeley, CA (US); Ryan Kautzman, San Francisco, CA (US); Gordon Cameron, Berkeley, CA (US); Jiayi Chong, South San Francisco, CA (US)

(73) Assignee: Pixar, Emeryville, CA (US)

( * ) Notice: Subject to any disclaimer, the term of this patent is extended or adjusted under 35 U.S.C. 154(b) by 753 days.

(21) Appl. No.: 12/329,333

(22) Filed: Dec. 5, 2008

(65) Prior Publication Data

US 2009/0306948 A1   Dec. 10, 2009

Related U.S. Application Data

(60) Provisional application No. 61/059,451, filed on Jun. 6, 2008.

(51) Int. Cl.
  *G06F 17/50* (2006.01)
(52) U.S. Cl. .......................................... 703/6
(58) Field of Classification Search ........................ 703/6
  See application file for complete search history.

(56) References Cited

U.S. PATENT DOCUMENTS

| | | | |
|---|---|---|---|
| 5,854,634 A * | 12/1998 | Kroitor | 345/473 |
| 7,363,198 B2 * | 4/2008 | Balaniuk et al. | 703/2 |
| 7,391,420 B1 * | 6/2008 | Coyne | 345/473 |
| 2002/0183992 A1 * | 12/2002 | Ayache et al. | 703/2 |
| 2008/0231640 A1 * | 9/2008 | Pighin et al. | 345/619 |

OTHER PUBLICATIONS

Jun-yong Noh, Ulich Neumann, "Expression Cloning", Computer Science Department, University of Southern California, 2001, 12 pages.*

Irving, G. et al., "Invertible Finite Elements for Robust Simulation of Large Deformation," *Eurographics/ACM SIGGRAPH Symposium on Computer Animation*, 2004, 11 pages.

* cited by examiner

*Primary Examiner* — Dwin M Craig
(74) *Attorney, Agent, or Firm* — Kilpatrick Townsend & Stockton LLP

(57) ABSTRACT

Systems and methods for simulating ballistic motion on an animated object by continuously defining rest poses of the animation object in a motion simulator. Tetrahedral finite element simulation may be used with control mechanisms that target the simulation pose towards the animation. A simulation mesh is generated for two or more animated poses based on a first simulation mesh corresponding to a first pose of the animated object. The simulation meshes of the two or more animated poses are provided to a simulator for use by the simulator such that in the absence of external force and acceleration the simulator output approximates the animated poses. Embodiments of the present invention are particularly useful for fleshy, blobby animation objects such as human characters, although the techniques can be used for other objects having different characteristics.

26 Claims, 3 Drawing Sheets

METHOD, SYSTEM AND COMPUTER READABLE MEDIA FOR DEFORMING SIMULATION MESHES USED IN POSING ANIMATED CHARACTERS

CROSS-REFERENCES TO RELATED APPLICATIONS

This application is a non-provisional of, and claims the benefit of, provisional application Ser. No. 61/059,451, filed Jun. 6, 2008, the contents of which are hereby incorporated by reference.

BACKGROUND

The present invention relates generally to computer graphics and animation, and more particularly to systems and methods for defining rest poses of an animation object.

For fleshy human characters, e.g., human characters in Pixar's WALL●E, an automatic system for secondary ballistic motion is desirable to add an extra level of realism and to lighten the burden on animators. This task can be complicated by the nonphysical nature of the underlying models; the secondary motion should look realistic even if the primary animation is exaggerated and stylized.

During pre-production, the human characters went through several stages of development. Early versions were made of transparent, gelatinous material instead of flesh, and were unrecognizable as humans. This posed interesting problems for animation and simulation. For example, how would one act with a facial performance on a material with no real structure? Also, how would the simulator preserve animation detail and still allow the material to undergo large deformation? As the story evolved the jelly creatures became more human, and the requirements of the simulator changed. Detail preservation grew easier as key details in the face and hands were now adjacent to bones and required less secondary motion, but maintaining animation silhouettes elsewhere in the body became more important.

Typically, a mass-spring system is used to model the internal physics of the material, e.g., skeleton structure of fleshy human characters. With constraint forces alone the large changes in shape between different poses of the character would be constantly fought by the spring forces in the simulation. For example, for sufficient deformations to a rest pose by an animator, the mass-spring system would tend to force the object back to the initial rest pose, thereby creating unrealistic animation.

Therefore it is desirable to provide systems and methods that overcome the above and other problems.

BRIEF SUMMARY

The present invention provides systems and methods for continuously defining rest poses of an animation object in a motion simulator.

Systems and methods are provided for simulating ballistic motion on an animated object by continuously defining rest poses of the animation object in a motion simulator. In one embodiment, tetrahedral finite element simulation is used together with control mechanisms that target the simulation pose towards the animation. In certain aspects, a simulation mesh is generated for two or more animated poses based on a first simulation mesh corresponding to a first pose of the animated object. The simulation meshes of the two or more animated poses are provided to a simulator for use by the simulator such that in the absence of external force and acceleration the simulator output approximates the animated poses. Embodiments of the present invention are particularly useful for fleshy, blobby animation objects such as human characters, although the techniques can be used for other objects having different characteristics.

According to one aspect of the present invention, a computer implemented method of dynamically targeting an arbitrary rest position for finite elements representing an object structure in an image is provided. The method typically includes defining an initial mesh representation representing an initial pose of an object in a first image frame, and defining a first configuration of finite elements representing a base rest state of an interior structure of the initial mesh representation. The finite elements typically include tetrahedra elements defining a skeleton-type structure for the object, however, other elements may be used. The method also typically includes receiving a specification of a target mesh representation representing a target pose of the object in a second image frame. For example, an animator may adjust the pose of the object to a desired location and/or orientation for the second frame. The second frame may be a keyframe, with many frames between the first frame and the second frame, or it may be an immediately subsequent frame. The method typically further includes determining a second configuration of finite elements representing a second rest state of an interior structure of the target mesh representation, determining a mapping function that transforms the configuration of finite elements of the base rest state to the configuration of finite elements of the target rest state, and applying the mapping function to the first plurality of finite elements. In certain aspects, where there is at least one intervening image frame between the first and second image frames, the method includes for each intervening frame, repeating steps such that the second rest state of the interior structure of one image frame is used as the base rest state of the interior structure for the next image frame. In this manner, for each frame, the rest state of the object is continuously updated at each image frame, or at each discrete point in time.

According to another aspect, a system is provided for dynamically targeting an arbitrary rest position for finite elements representing an object structure in an image. The system typically includes a processor, and a memory coupled to the processor. The memory is typically configured to store a set of instructions which when executed by the processor cause the processor to perform a method comprising defining an initial mesh representation representing an initial pose of an object in a first image frame, defining a first configuration of finite elements representing a base rest state of an interior structure of the initial mesh representation, receiving a specification of a target mesh representation representing a target pose of the object in a second image frame, and determining a second configuration of finite elements representing a second rest state of an interior structure of the target mesh representation. The method also typically includes determining a mapping function that transforms the configuration of finite elements of the base rest state to the configuration of finite elements of the target rest state, and applying the mapping function to the first plurality of finite elements.

According to another aspect, a computer implemented method is provided for simulating ballistic motion on an animated object by adjusting a simulation process such that, in the absence of external forces or acceleration, a simulator mesh output approximates one or more animated poses of the animated object. The method typically includes receiving two or more animated poses of an animated object, receiving a first simulation mesh corresponding to a first pose of the animated object, and generating a simulation mesh for the two or more animated poses based on the first simulation mesh the method also typically includes providing the generated simulation meshes of the two or more animated poses to a simulator for use by the simulator wherein the simulator mesh output approximates the two or more animated poses.

According to another aspect, a computer implemented method is provided for simulating ballistic motion on an animated object by adjusting a simulation process such that, in the absence of external forces or acceleration, a simulator mesh output approximates one or more animated poses of the animated object. The method typically includes receiving two or more animated poses of an animated object, receiving a first simulation mesh corresponding to a first pose of the animated object, and generating a simulation mesh for the two or more animated poses based on the first simulation mesh. The method also typically includes providing the simulation meshes of the two or more animated poses to a simulator for use by the simulator wherein the simulator uses the simulation meshes to produce a simulation output that differs from the animated poses based only on a ballistic response to an acceleration applied to the object.

According to another aspect, a computer implemented method is provided for simulating motion on an animated object by adjusting a simulation process such that, in the absence of external forces or acceleration, a simulator mesh output approximates one or more animated poses of the animated object. The method typically includes receiving two or more animated poses of an animated object, receiving a first simulation mesh corresponding to a first pose of the animated object, and generating a simulation mesh for the two or more animated poses based on the first simulation mesh. The method also typically includes providing the simulation meshes of the two or more animated poses to a simulator for use by the simulator wherein the simulator uses the simulation meshes to produce a simulation output that differs from the animated poses based only on a response to an external force applied to the object. An external force might include another object striking the animated object.

According to yet another aspect, a computer readable medium is provided that stores a set of code modules which when executed by a processor cause the processor to dynamically target an arbitrary rest position for finite elements representing an object structure in an image. The computer program product typically includes code for defining an initial mesh representation representing an initial pose of an object in a first image frame, code for defining a first configuration of finite elements representing a base rest state of an interior structure of the initial mesh representation, code for receiving a specification of a target mesh representation representing a target pose of the object in a second image frame, and code for determining a second configuration of finite elements representing a second rest state of an interior structure of the target mesh representation. The computer program product also ally includes code for code for determining a mapping function that transforms the configuration of finite elements of the base rest state to the configuration of finite elements of the target rest state, and code for applying the mapping function to the first plurality of finite elements.

According to still a further aspect, a computer implemented method is provided for simulating ballistic motion on an animated object. The method typically includes receiving two or more animated poses of an animated object, receiving a first simulation mesh corresponding to a first pose of the animated object, generating a simulation mesh for the two or more animated poses based on the first simulation mesh by adjusting an energy function associated with a configuration of finite elements so that the simulation mesh is in or near a minimum energy state, and providing the simulation meshes of the two or more animated poses to a simulator for use by the simulator.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1a) shows an animated surface at time t0, and FIG. 1b) shows the animated surface at time t0+n, n>0.

DETAILED DESCRIPTION

The present invention provides systems and methods for continuously defining rest poses of an animation object in a motion simulator. In one embodiment, tetrahedral finite element simulation is used with control mechanisms that target the simulation pose towards the animation. Embodiments of the present invention are particularly useful for fleshy, blobby animation objects such as human characters, although the techniques can be used for other objects having different characteristics.

1 Finite Element Simulation

Where initial character designs of fleshy humans involve extreme deformations for both primary and secondary motion, it is desirable that the simulator behave smoothly and robustly in situations with many degenerate and inverted tetrahedra. In one embodiment, the finite element method of Irving, G. et al., *Proc. of the ACM SIGGRAPH/Eurographics Symp. on Comput. Anim.*, ACM, 131-140 (2004) is used for the internal physics of the material as opposed to a mass-spring system. Finite elements enable the ability to capture the incompressible and biphasic nature of biological tissue as may be used on fleshy human characters and other characters. Biphasic response allows the material to be soft enough for interesting surface rippling but harden under large deformation to avoid undesirable mesh collapse. These phenomena are difficult to capture with mass-spring models.

Starting from an animation sequence defined only on a surface mesh, it is desirable to add dynamic secondary motion without deviating from animation poses when the character is not moving. In particular, static poses need to be well matched even though the shapes from animation may not be physically based. At the same time, the simulation needs to take over and deform the character, oftentimes radically, under sufficient external impulse. To achieve this, in one aspect, the target animation (pose of the object) is diffused to the interior vertices of the mesh by solving an elliptic equation discretized on the tetrahedra using the surface animation as a boundary condition. In one aspect, two complementary control mechanisms are then applied: a system of soft constraints pulling each simulated point towards its target, and a direct modification to the rest state of each tetrahedron to match the current shape of the animation. With constraint forces alone the large changes in shape between different poses of the character would be constantly fought by the finite element forces in the simulation, smoothing out deformation around joints and adding creases in undesirable places. Advantageously, continuously altering the rest state in this manner allows the simulation to respect these natural shape changes without damping out interesting dynamic motion. In general, any elliptic equation including non-linear elliptic equations may be used. Examples of elliptic equations include a Laplace equation, a Poisson equation and others.

Figure 3:
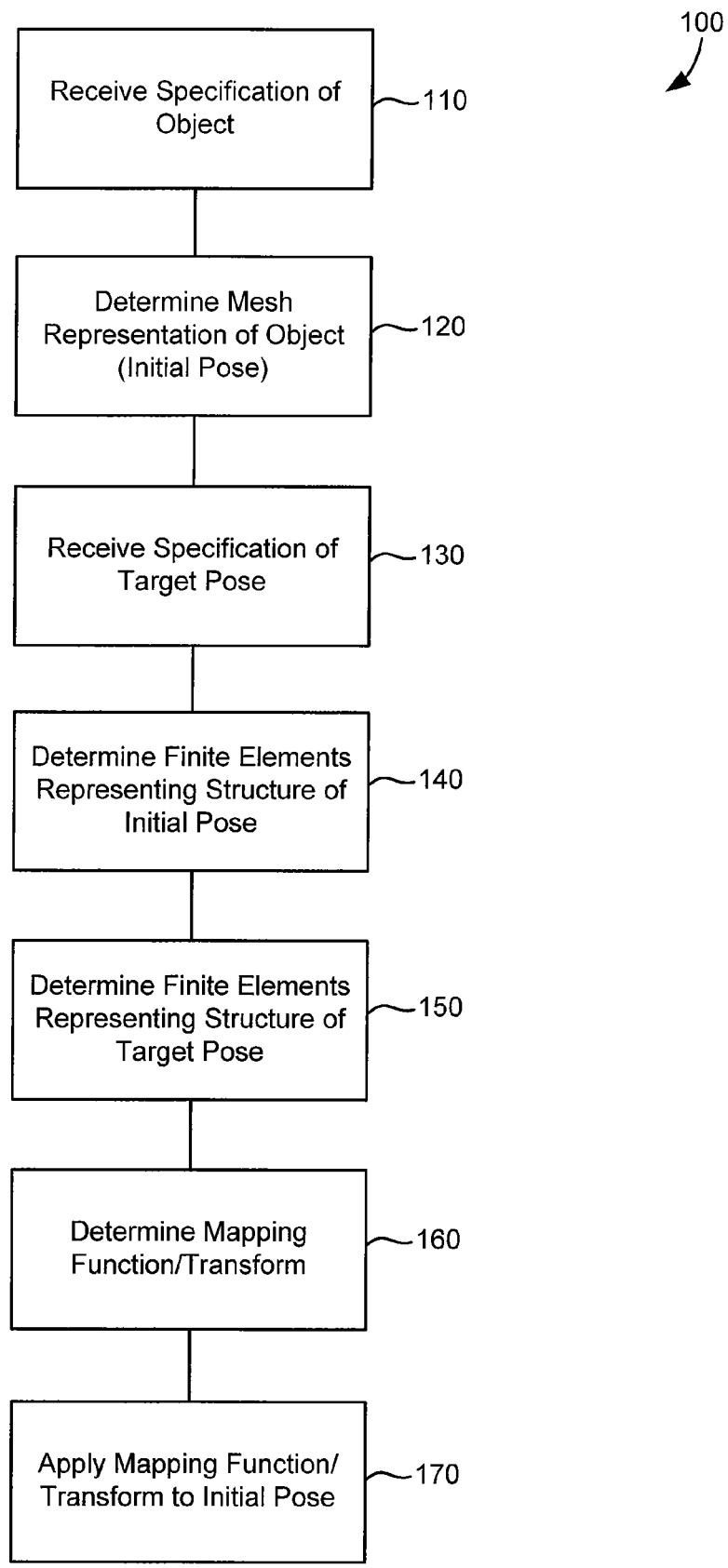
FIG. 3 illustrates a method for defining a target rest pose according to one embodiment.
Figure 4:
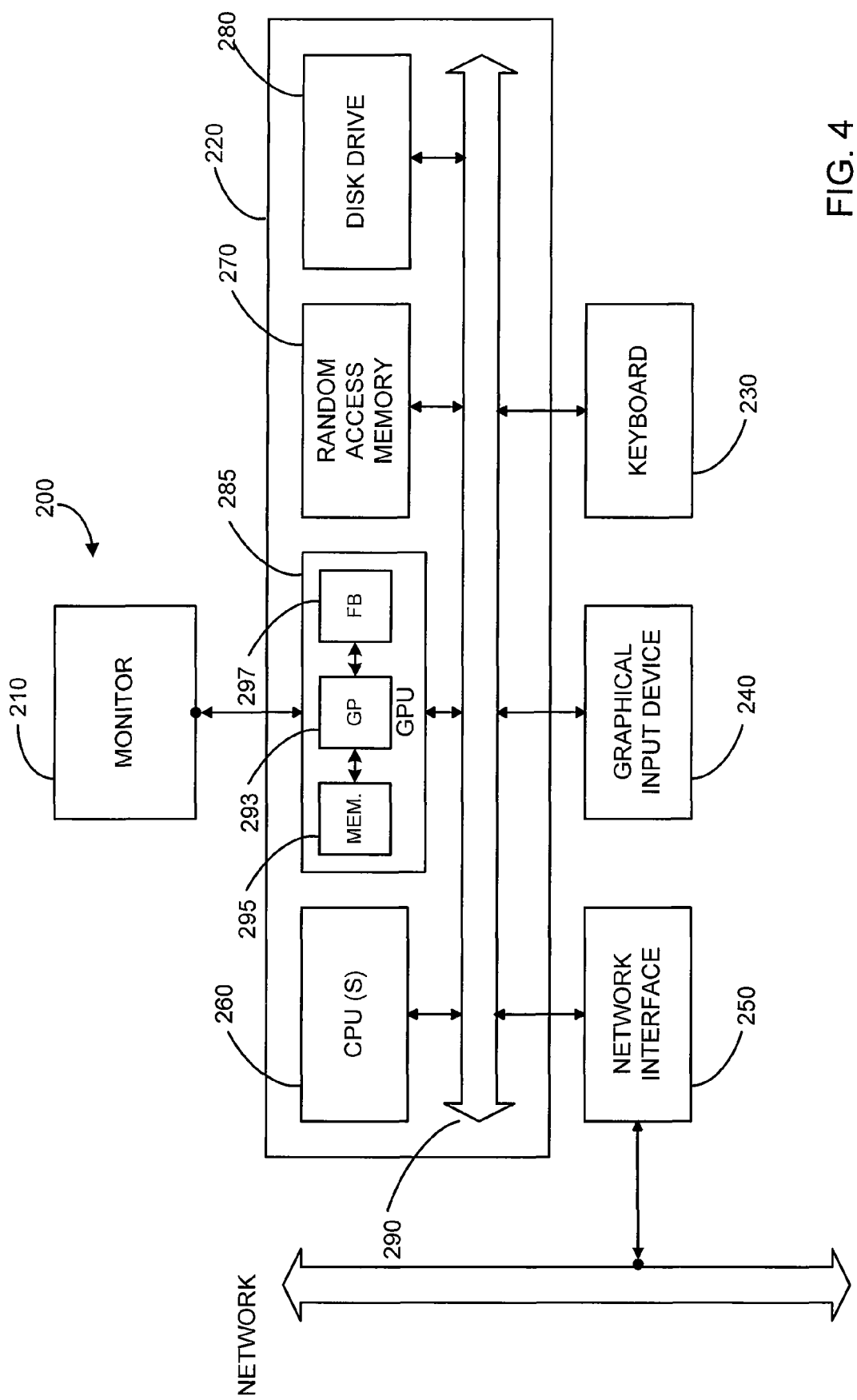
FIG. 4 is a block diagram of a computer system that may be used to practice embodiments of the present invention.

A method 100 for targeting a rest pose according to one embodiment is shown in FIG. 3. In step 110, a specification of an object in an initial pose is received. The specification may include a list of vertices of points of the object and any other information usable by a simulator and rendering system. The object may be fleshy, deformable character, such as a fleshy human, or other character. In step 120, a mesh representation of the surface of the object in the initial pose is determined. The initial mesh representation may be part of the received specification, or it may be determined from the object specification as is well known. In step 130, a specification of a second (target) pose is received. For example, an animator may define a target pose for the character. In step 140, a finite element representation of the initial pose is determined. In this step, a configuration of finite elements, such as tetrahedra, is determined for an internal structure of the character to transform into from the initial pose after one or more image frames. For example, in one aspect, the surface of the initial pose of the object is diffused to the interior vertices of the mesh. This is done, in one embodiment, by solving a elliptic equation discretized on the tetrahedra using the surface of the animation object as a boundary condition. One example is using an elliptic equation such as a Laplace equation. Where the character is a human, the internal structure might represent a human skeleton or similar structure. In step 150, a finite element representation of the target pose is determined. For example, where an animator has modified the pose, a mesh of the target pose is determined and from that, the configuration of finite elements is determined for the target pose. For example, in one aspect, the surface of the target pose of the object is diffused to the interior vertices of the mesh. This is done, in one embodiment, by solving a elliptic equation discretized on the tetrahedra using the surface of the animation object as a boundary condition.

In step 160, a mapping function that transforms the initial rest state configuration of finite elements into the target rest state configuration is determined. According to one embodiment, a transform is defined as follows:

$$H = D_{anim} D_{rest}^{-1}$$

$$H = U\hat{H}V^T (\text{diagonalize } H)$$

$$\hat{H}_{Final} = \exp[\text{clamp}(\log \hat{H}, -2, 2)](\text{adjust } H)$$

$$H_{Final} = U\hat{H}_{Final} V^T (\text{defines new rest state}),$$

where $D_{anim}$ is a 3×3 matrix that represents the shape of the tetrahedra in the target animation pose frame, and $D_{rest}$ is a 3×3 matrix that represents the shape of the tetrahedra in the initial rest pose. H is the linear mapping from an initial rest state to a final rest state (e.g., animation pose). In this embodiment, the deformation gradient between the original and modified rest state is clamped in logarithmic space to avoid sliver tetrahedra in extreme poses. The clamping factor (2 in the example above) is set such that an element does not shrink or stretch more than this factor. This helps prevent flattening and inverting. It should be appreciated that a different clamping factor, or no clamping factor may be used.

In step 170, the mapping function is applied to the initial configuration of finite elements; this transforms the initial rest state to the new rest state. In certain aspects, the there is at least one intervening image frame between the initial and target image frames. Hence, in one embodiment, for each frame (or discrete point in time), steps 140-170 are repeated, such that the determined new rest state (target pose) of the interior structure of one image frame is used as the base rest state (initial pose) of the interior structure for the next image frame. In certain aspects, the intermediate frames can computed either by interpolating the rest pose matrices in logarithmic space, or by interpolating the result of the Laplace equation and redoing the clamping at each desired time. Continuously altering the rest state on a frame-by-frame basis allows the simulation to respect natural shape changes without damping out interesting dynamic motion.

Figure 1A:
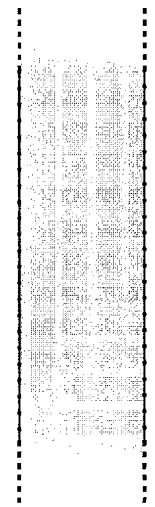
FIGS. 1a) to 2c illustrate a method of rest state retargeting according to one embodiment.
Figure 1B:
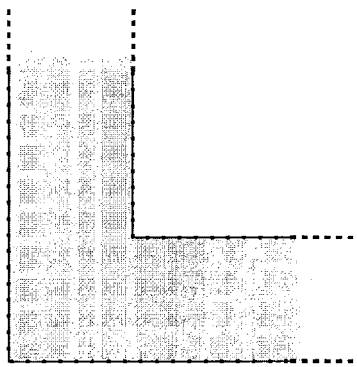
Figure 2A:
FIG. 2a) shows an initial simulation mesh at t0.
Figure 2B:
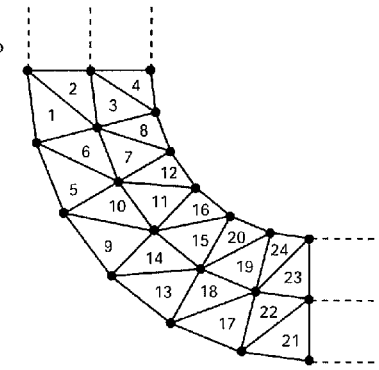
FIG. 2b) shows the simulation mesh at time t0+n without applying a retargeting method.
Figure 2C:
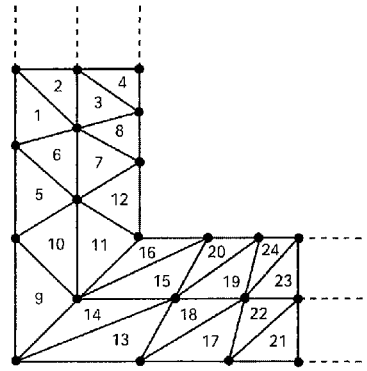
FIG. 2c) shows the simulation mesh at time t0+n with rest state retargeting.

FIGS. 1a) to 2c) illustrate a method of rest state retargeting according to one embodiment. FIG. 1a) shows an animated surface at time t0, and FIG. 1b) shows the animated surface at time t0+n, n>0. FIG. 2a) shows an initial simulation mesh at t0; FIG. 2b) shows the simulation mesh at time t0+n without applying a retargeting method; and FIG. 2c) shows the simulation mesh at time t0+n with rest state retargeting. FIG. 2c is a demonstration both of what the results of the simulation would be were it to run to equilibrium (without external influences such as force or acceleration), and the target rest position of the simulation mesh; one advantage of this method is that they're the same. The distribution of interior vertices in FIGS. 1a to 2a, or 1b to 2c are examples of using an energy minimization function (e.g., elliptic equation such as a Laplace equation) to derive a rest state for the simulation mesh.

According to one embodiment, generating a simulation mesh for an animated pose based on a simulation mesh includes adjusting an energy function associated with a configuration of finite elements so that the simulation mesh is in or near a minimum energy state. One form of an elastic energy for a solid is \Psi=\int_\Omega \psi(F) dV, where \int_\Omega is the integral over the volume of the material and \psi(F) is the energy density at each point as a function of a deformation gradient F. F is the gradient of the current positions of the object (x) with respect to the rest positions of the object (X), i.e., F=dx/dX. There are various ways to modify the energy function. For example, the rest position X can be replaced with modified position X' directly to get F'=dx/dX', or a multiplicative transform can be applied to F to get F'=F_adjust.

In one embodiment, soft constraint springs are integrated implicitly to allow their stiffness to be ramped arbitrarily high to match animation exactly in certain areas of the mesh. Since the springs at different points are independent this does not require a linear system solve. In certain aspects, all other integration is explicit for the elastic forces and implicit on the damping forces to preserve detail in the simulation.

2 Pipeline

In certain embodiments, a streamlined interface is provided for animators to run simulations and interactively adjust results. Real time kinematic colliders may be used to give animators direct feedback during interaction with objects, and the same geometry can then be fed to the simulation for dynamic collisions. Spatially varying material properties are mapped from surfaces to the mesh interior via a Laplace equation and then adjusted with a volumetric paint tool. All simulations may be run in parallel using the Message Passing Interface MPI (see, e.g., the mpi-forum dot org website)

Most simulations involved one or two characters and were restricted to adding only secondary motion. In shots with large crowds of interacting humans, the simulator also controlled the global position and orientation of each character. Animators created a variety of stationary animation cycles, and the position, orientation, and momentum of the animation were continuously adjusted to match the simulation before targeting forces were applied.

3. General System Architecture

FIG. 2 is a block diagram of a computer system that may be used to practice embodiments of the present invention. FIG. 2 is merely illustrative of an embodiment incorporating the present invention and does not limit the scope of the invention as recited in the claims. One of ordinary skill in the art would recognize other variations, modifications, and alternatives.

In one embodiment, computer system 200 typically includes a monitor 210, computer 220, a keyboard 230, a user input device 240, computer interfaces 250, and the like.

In various embodiments, user input device 240 is typically embodied as a computer mouse, a trackball, a track pad, a joystick, wireless remote, drawing tablet, voice command system, eye tracking system, and the like. User input device 240 typically allows a user to select objects, icons, text and the like that appear on the monitor 210 via a command such as a click of a button or the like.

Embodiments of computer interfaces 250 typically include an Ethernet card, a modem (telephone, satellite, cable, ISDN), (asynchronous) digital subscriber line (DSL) unit, FireWire interface, USB interface, and the like. For example, computer interfaces 250 may be coupled to a computer network, to a FireWire bus, or the like. In other embodiments, computer interfaces 250 may be physically integrated on the motherboard of computer 220, and may be a software program, such as soft DSL, or the like.

In various embodiments, computer 220 typically includes familiar computer components such as a processor 260, and memory storage devices, such as a random access memory (RAM) 270, disk drives 280, a GPU 285, and system bus 290 interconnecting the above components.

In some embodiment, computer 220 includes one or more Xeon microprocessors from Intel. Further, one embodiment, computer 220 includes a UNIX-based operating system.

RAM 270 and disk drive 280 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 285 may be any conventional graphics processing unit that may be user programmable. Such GPUs are available from NVIDIA, ATI, and other vendors. In this example, GPU 285 includes a graphics processor 293, a number of memories and/or registers 295, and a number of frame buffers 297.

FIG. 2 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

The various embodiments and aspects discussed herein can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of dynamically targeting an arbitrary rest position for finite elements representing an object structure in an image, the method comprising:
   a) receiving, at one or more computer systems, information defining an initial mesh representation representing an initial pose of an object in a first image frame;
   b) receiving, at the one or more computer systems, information defining a configuration of finite elements representing a rest state of an interior structure of the initial mesh representation;
   c) receiving, at the one or more computer systems, a specification of a target mesh representation representing a target pose of the object in a second image frame;
   d) determining, with one or more processors associated with the one or more computer systems, a configuration of finite elements representing a rest state of an interior structure of the target mesh representation;
   e) determining, with the one or more processors associated with the one or more computer systems, a mapping function that transforms the configuration of finite elements of the rest state of the interior structure of the initial mesh representation to the configuration of finite elements of the rest state of the interior structure of the target mesh representation; and
   f) generating, with the one or more processors associated with the one or more computer systems, information in response to applying the mapping function to a plurality of finite elements.

2. The method of claim 1, wherein there is at least one intervening image frame between the first and second image frames, and wherein for each intervening frame, repeating steps c)-f), wherein the rest state of the interior structure of the target mesh representation in a first intervening image frame is used as the rest state of the interior structure of the initial mesh representation for a second intervening image frame succeeding the first intervening image frame.

3. The method of claim 2, wherein each intervening image frame between the first and second frames has an intermediate target pose having a corresponding mesh representation, and wherein each repeated step for determining a configuration of finite elements representing a rest state of an interior structure of the target mesh representation includes solving an elliptic equation using the intermediate mesh representation as a boundary condition.

4. The method of claim 3, wherein the mesh representation for the intermediate target pose for each intervening frame is determined by interpolation using the initial pose and the target pose.

5. The method of claim 1, further comprising defining a plurality of finite elements in the configuration of finite elements representing the rest state of the interior structure of the initial mesh representation in response to solving an elliptic equation using the initial mesh representation as a boundary condition.

6. The method of claim 1, further comprising determining a plurality of finite elements in the configuration of finite elements representing the rest state of the interior structure of the target mesh representation in response to solving an elliptic equation using the target mesh representation as a boundary condition.

7. The method of claim 1, wherein determining, with the one or more processors associated with the one or more computer systems, the mapping function comprises determining a mapping that transforms the configuration of finite elements of the rest state of the interior structure of the initial mesh representation having a first discretization to the configuration of finite elements of the rest state of the interior structure of the target mesh representation having a second discretization different from the first discretization.

8. The method of claim 1, wherein determining, with the one or more processors associated with the one or more computer systems, the mapping function comprises adjusting an energy function associated with the configuration of finite elements of the rest state of the interior structure of the initial mesh representation so that the to the configuration of finite elements of the rest state of the interior structure of the target mesh representation is in or near a minimum energy state.

9. The method of claim 1, further comprising:
generating, with the one or more processors associated with the one or more computer systems, an output mesh based on the information generated in response to applying the mapping function to the plurality of finite elements, the output mesh approximating the target pose of the object in the second image frame in the absence of external forces or acceleration or that differs from the target pose of the object in the second image frame only on a ballistic response to an acceleration applied to the object.

10. A non-transitory computer-readable medium storing computer-executable code for dynamically targeting an arbitrary rest position for finite elements representing an object structure in an image, the non-transitory computer-readable medium comprising:

a) code for receiving information defining an initial mesh representation representing an initial pose of an object in a first image frame;
b) code for receiving information defining a configuration of finite elements representing a rest state of an interior structure of the initial mesh representation;
c) code for receiving a specification of a target mesh representation representing a target pose of the object in a second image frame;
d) code for determining a configuration of finite elements representing a rest state of an interior structure of the target mesh representation;
e) code for determining a mapping function that transforms the configuration of finite elements of the rest state of the interior structure of the initial mesh representation to the configuration of finite elements of the rest state of the interior structure of the target mesh representation; and
f) code for generating information in response to applying the mapping function to a plurality of finite elements.

11. The non-transitory computer-readable medium of claim 10, wherein there is at least one intervening image frame between the first and second image frames, and wherein for each intervening frame, repeating execution of the code c)-f), wherein the rest state of the interior structure of the target mesh representation in a first intervening image frame is used as the rest state of the interior structure of the initial mesh representation for a second intervening image frame succeeding the first intervening image frame.

12. The non-transitory computer-readable medium of claim 11, wherein each intervening image frame between the first and second frames has an intermediate target pose having a corresponding mesh representation, and wherein each repeated execution of the code for determining a configuration of finite elements representing a rest state of an interior structure of the target mesh representation includes code for solving an elliptic equation using the intermediate mesh representation as a boundary condition.

13. The non-transitory computer-readable medium of claim 12, wherein the mesh representation for the intermediate target pose for each intervening frame is determined by interpolation using the initial pose and the target pose.

14. The non-transitory computer-readable medium of claim 10, further comprising code for defining a plurality of finite elements in the configuration of finite elements representing the rest state of the interior structure of the initial mesh representation in response to solving an elliptic equation using the initial mesh representation as a boundary condition.

15. The non-transitory computer-readable medium of claim 10, further comprising code for determining a plurality of finite elements in the configuration of finite elements representing the rest state of the interior structure of the target mesh representation in response to solving an elliptic equation using the target mesh representation as a boundary condition.

16. The non-transitory computer-readable medium of claim 10, wherein the code for determining the mapping function comprises code for determining a mapping that transforms the configuration of finite elements of the rest state of the interior structure of the initial mesh representation having a first discretization to the configuration of finite elements of the rest state of the interior structure of the target mesh representation having a second discretization different from the first discretization.

17. The non-transitory computer-readable medium of claim 10, wherein the code for determining the mapping function comprises adjusting an energy function associated with the configuration of finite elements of the rest state of the interior structure of the initial mesh representation so that the to the configuration of finite elements of the rest state of the interior structure of the target mesh representation is in or near a minimum energy state.

18. The non-transitory computer-readable medium of claim 10, further comprising:

code for generating an output mesh based on the information generated in response to applying the mapping function to the plurality of finite elements, the output mesh approximating the target pose of the object in the second image frame in the absence of external forces or acceleration or that differs from the target pose of the object in the second image frame only on a ballistic response to an acceleration applied to the object.

19. A system for dynamically targeting an arbitrary rest position for finite elements representing an object structure in an image, the system comprising:

a processor; and a memory configured to store a set of executable instructions that configure the processor to:
 a) receive information defining an initial mesh representation representing an initial pose of an object in a first image frame;
 b) receive information defining a configuration of finite elements representing a rest state of an interior structure of the initial mesh representation;
 c) receive a specification of a target mesh representation representing a target pose of the object in a second image frame;
 d) determine a configuration of finite elements representing a rest state of an interior structure of the target mesh representation;
 e) determine a mapping function that transforms the configuration of finite elements of the rest state of the interior structure of the initial mesh representation to the configuration of finite elements of the rest state of the interior structure of the target mesh representation; and
 f) generate information in response to applying the mapping function to a plurality of finite elements.

20. The system of claim 19, wherein there is at least one intervening image frame between the first and second image frames, and wherein for each intervening frame, the processor is configured to repeat steps c)-f), wherein the rest state of the interior structure of the target mesh representation in a first intervening image frame is used as the rest state of the interior structure of the initial mesh representation for a second intervening image frame succeeding the first intervening image frame.

21. The system of claim 20, wherein each intervening image frame between the first and second frames has an intermediate target pose having a corresponding mesh representation, and wherein in each repeated step for determining a configuration of finite elements representing a rest state of an interior structure of the target mesh representation the processor is configured to solve an elliptic equation using the intermediate mesh representation as a boundary condition.

22. The system of claim 21, wherein the mesh representation for the intermediate target pose for each intervening frame is determined by interpolation using the initial pose and the target pose.

23. The system of claim 19, wherein the processor is further configured to determine a plurality of finite elements in the configuration of finite elements representing the rest state of the interior structure of the initial mesh representation in response to solving an elliptic equation using the initial mesh representation as a boundary condition.

24. The system of claim 19, wherein the processor is further configured to determine a plurality of finite elements in the configuration of finite elements representing the rest state of the interior structure of the target mesh representation in response to solving an elliptic equation using the target mesh representation as a boundary condition.

25. The system of claim 19, wherein to determine the mapping function the processor is configured to determine a mapping that transforms the configuration of finite elements of the rest state of the interior structure of the initial mesh representation having a first discretization to the configuration of finite elements of the rest state of the interior structure of the target mesh representation having a second discretization different from the first discretization.

26. The system of claim 19, wherein to determine the mapping function the processor is configured to adjust an energy function associated with the configuration of finite elements of the rest state of the interior structure of the initial mesh representation so that the to the configuration of finite elements of the rest state of the interior structure of the target mesh representation is in or near a minimum energy state.

* * * * *